Patented June 19, 1951

2,557,667

UNITED STATES PATENT OFFICE 2,557,667

REACTION PRODUCTS OF A CYANURIC TRIESTER AND A POLYHYDRIC ALCOHOL AND METHODS OF PREPARING THE SAME

Edward L. Kropa, Old Greenwich, Conn., assignor to American Cyanamid Company, New York, N. Y., a corporation of Maine No Drawing. Application January 10, 1947, Serial No. 721,488

17 Claims. (Cl. 260—2)

This invention relates to new synthetic materials having particular utility in the plastics and coating arts and to methods of preparing the same. More particularly the invention is concerned with compositions comprising a synthetic material, specifically a resinous material or composition, which is obtained by effecting reaction between ingredients including (1) a cyanuric triester of a primary, ethylenically unsaturated monohydric alcohol containing at least 3 and not more than 10 carbon atoms, e. g., triallyl cyanurate, trimethallyl cyanurate, etc., and (2) a polyhydric alcohol in which the hydroxy groups are members of the class consisting of primary and secondary hydroxy groups, e. g., glycerol, ethylene glycol, diethylene glycol, propylene glycol, dipropylene glycol, etc.; and methods of preparing such compositions.

The cyanuric triesters used in practicing the present invention may be represented by the general formula I
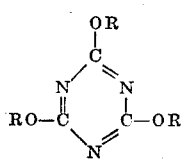

where R represents a monovalent radical which corresponds to the residue of a primary, ethylenically unsaturated monohydric alcohol containing at least 3 and not more than 10 carbon atoms. Illustrative examples of radicals which R in the above formula may represent are allyl, methallyl, ethallyl, propallyl, 2-butenyl, 3-butenyl, 3-methyl-2-butenyl, 3-methyl-3-butenyl, 2-pentenyl, 3-pentenyl, 4-pentenyl, 2-methyl-2-pentenyl, 3-methyl-4-pentenyl, 2-hexenyl, 2-octenyl, 3-nonenyl, 2-decenyl, etc. The monovalent radicals represented by R in the above formula may be the same or different.

It is an object of the present invention to provide a new class of synthetic materials, more particularly resinous compositions, which have particular utility in the plastics and coating arts, e. g., as coating, laminating, adhesive, impregnating, casting and molding compositions, or as components of such compositions.

Another object of the invention is to provide resinous compositions of the thermoplastic and thermosetting or potentially thermosetting types, which compositions reach their ultimate form by a condensation reaction alone in the case of complete transesterification products or by a combination of polymerization and condensation reactions in the case of partial transesterification products.

Another object of the present invention is to provide resinous materials containing polymerizably reactive groups and which can be polymerized to their ultimate form, alone or admixed with other simple or resinous unsaturated compounds copolymerizable therewith, to yield new and valuable polymers and copolymers.

Another object of the invention is to provide casting and molding compositions which have considerable less "after-shrinkage" than the conventional casting and molding compositions containing resinous materials which become cured or thermoset solely by a condensation reaction.

A further object of this invention is to provide an economical and efficient method by which the new synthetic materials described in the first paragraph of the specification can be prepared.

Other objects of the invention will be apparent to those skilled in the art as the description of the invention proceeds.

It was known prior to my invention that a triazinyl ester different from those embraced by Formula I, specifically trimethyl cyanurate, could be transesterified with a monohydric alcohol. Thus, Hofmann [Ber. 19, 2061-2083 (1886)] observed that if trimethyl cyanurate be refluxed with an equivalent amount of sodium ethoxide in ethanol, it is completely transformed to the triethyl ester. However, to the best of my knowledge and belief the reaction, more particularly a transesterification reaction, between (1) a polyhydric alcohol wherein the hydroxy groups are either all primary or all secondary or some primary and some secondary and (2) a triazine derivative of the kind embraced in Formula I to yield synthetic materials varying in properties from liquids to hard, brittle resins was not known prior to my invention. Furthermore, it was not known or suggested that a cyanuric triester of the kind employed in practicing my invention could be partially transesterified with a polyhydric alcohol of the kind aforementioned thereby to obtain a polymerizable partial transesterification product, and that such a product then could be polymerized to yield a resinous polymer of the partial transesterification product.

In practicing my invention reaction is effected between ingredients including a cyanuric triester of a primary, ethylenically unsaturated monohydric alcohol containing at least 3 and not more than 10 carbon atoms and a polyhydric alcohol, preferably a dihydric alcohol, in which the hydroxy groups are either all primary or all secondary or some primary and some secondary. The reaction is essentially a transesterification reaction, especially if conducted under heat a a temperature not exceeding about 155° C. In a transesterification reaction between a cyanuric triester of the kind covered by Formula I and a polyhydric alcohol some side reactions can occur, especially at temperatures of and above about 165° C., e. g., molecular rearrangement of the cyanuric triester to an isomeric form and autoalkylation of the said triester with resultant formation of hydroxy-1,3,5-triazines which destroy or tend to destroy any alkali metal or alkali-metal alcoholate used as a catalyst for the reaction. However, such side reactions can be effectively avoided by carrying out the transesterification reaction at a temperature not exceeding about 155° C., and preferably below 150° C., during all or most of the reaction period. In practicing my invention to obtain linear polymeric materials and which contain an unsaturated monohydric alcohol ester grouping, I therefore prefer to conduct the reaction between the cyanuric triester and the polyhydric alcohol fairly rapidly at a relatively low temperature, thereby either obviating such side reactions substantially completely or reducing them to a minimum.

As indicated above, a reaction between the cyanuric triester and the polyhydric alcohol will proceed under heat in the absence of a catalyst. However, in preparing my new synthetic materials a catalyst for the reaction ordinarily is employed, the kind and amount of catalyst being so chosen that the reaction will proceed in the desired direction with a minimum formation of undesired by-products. As catalysts for the transesterification reaction, I prefer to use a member of the class consisting of alkali metals, more particularly sodium, potassium, lithium, rubidium or caesium (or mixtures thereof) and alcoholates of alkali metals (or mixtures thereof). The catalyst may be employed in the form of a mixture of an alkali metal and an alcoholate of such a metal. If the catalyst is not initially in the form of an alkali-metal alkoxide or alcoholate, the latter is formed when the alkali metal is dissolved in the polyhydric alcohol reactant.

The amount of catalyst may be varied over a wide range depending, for example, upon the particular cyanuric triester and polyhydric alcohol employed and the particular properties desired in the finished product. Ordinarily, however, the catalyst is used in an amount, calculated as alkali metal, e. g., sodium, corresponding to at least 1.5 mol per cent, preferably from 2 to 10 or 12 mol per cent, of the molar amount of the cyanuric triester employed. The use of higher percentages of catalyst is not precluded, but no particular advantage ordinarily accrues therefrom. Optimum results have been obtained when the amount of catalyst, calculated as alkali metal, was from about 4 to about 8 mol per cent of the molar amount of the cyanuric triester used.

The proportions of the cyanuric triester and the polyhydric alcohol may be considerably varied, e. g., from substantially more than 1 mol (for instance, 2 or 3 or more mols) of polyhydric alcohol, e. g., a glycol, per mol of the said triester to substantially more than 1 mol, e. g., 2 or 3 or more mols, of the triester per mol of the polyhydric alcohol. Approximately equimolecular proportions or stoichiometrical proportions of each reactant may be used if desired. When it is desired to produce a polymerizable partial transesterification product, the cyanuric triester, e. g., triallyl cyanurate, is preferably employed in an amount corresponding to substantially more than 1 mol thereof for each mol of the polyhydric alcohol reactant. If desired, either the cyanuric triester or the polyhydric alcohol may be used substantially in excess of stoichiometrical proportions.

The reaction may be effected in the presence or absence of an inert solvent, that is, a solvent which is inert during the reaction, e. g., benzene, toluene, xylene, mineral spirits, etc. If an inert solvent or a substantial molecular excess of polyhydric alcohol be employed, the reaction may be carried out at atmospheric pressure. If an inert solvent or a substantial molecular excess of polyhydric alcohol be not employed, then the reaction advantageously is conducted in large part under reduced pressure, e. g., from 750 mm. down to 0.5 mm. pressure, the lower pressures being used at least toward the end of the reaction period. The pressure may be adjusted as desired or as conditions may require in order to effect the reaction without substantial decomposition of the reactants and to remove, e. g., by distillation, the volatile matter, more particularly the by-product alcohol, from the reaction vessel as transesterification between the reactants proceeds. If desired, any unreacted polyhydric alcohol or cyanuric triester, or both such reactants, may be removed from the reaction mass, e. g., by distillation, at the end of the primary reaction period.

The substantially completely transesterified products of this invention give rise to the formation of three-dimensional polymeric structures, that is, resinous materials which are thermosetting or potentially thermosetting. When the polyhydric alcohol is ethylene glycol only a simple derivative initially results upon formation of the completely transesterified product, namely, tri-B-hydroxyethyl cyanurate. However, when this compound (a potentially thermosetting material) is heated either in the presence or absence of catalysts, a three-dimensional condensation product is produced through the partial loss of ethylene glycol.

The transesterification reaction between the cyanuric triester and the polyhydric alcohol can be effected, e. g., by careful control of the reaction conditions including the time and temperature of reaction, catalyst used, etc., so that a partial transesterification product or substantially linear polymer in which one of the unsaturated ester groupings of the starting triester has not undergone transesterification results. The general reaction involved in the preparation of such linear polymers may be illustrated by the following equation in which a dihydric alcohol is shown as the alcohol employed:

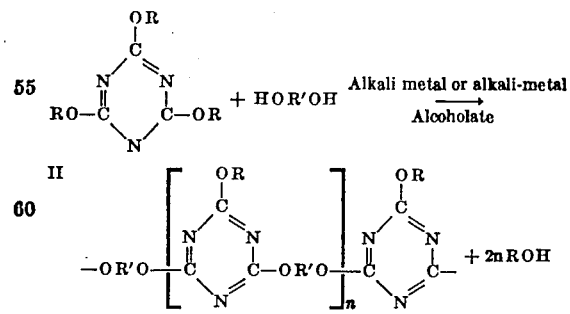

In the above equation R has the same meaning as given above with reference to Formula I and R' represents the hydrocarbon chain of a dihydric alcohol. Surprisingly, such a reaction does not occur when the starting triazine derivative is cyanuric acid, that is, when R in the formula for the triazine reactant represents hydrogen.

In some cases the reaction starts at around room temperature (20°–30° C.) while in others temperatures of the order of 40° or 50° C. or higher, e. g. 60°–70° C. are required for initiating the reaction. Good results are obtained by heating the reaction mass, preferably under reduced pressure, at a final temperature of approximately 140° to 155° C., preferably at about 140° to 150° C., until no more alcohol is evolved and all other volatile constituents are removed. The total time of reaction will vary considerably depending, for example, upon the size of the batch, the particular reactants employed and other influencing factors. Ordinarily, however, the transesterification reaction is either completed or carried to the extent desired by heating the mixed reactants in the presence of the catalyst under reduced pressure at from about 60° or 70° C. to about 155° C. for about ½ to about 5 or 6 hours.

If a more complex resinous material is desired, it may be obtained by heating the reaction mass substantially above 155° C., e. g., from about 165° to 200° C. or more, for a prolonged period under reduced pressure or at a lower temperature at atmospheric pressure. This high temperature reaction may be effected in the presence or absence of solvents as hereinbefore described.

The transesterification or condensation reaction between the polyhydric alcohol and the cyanuric triester may be carried to partial completion, the partial reaction product thereafter removed from the reaction vessel and the reaction completed in the presence or absence of other ingredients (e. g., pigments, fillers, dyes, opacifiers, etc.) at temperatures of the order of 100° to 155° C. or higher during molding or other use of the material, e. g., after a coating composition comprising the same has been applied to a surface to be protectively coated. When the partial transesterification product contains a polymerizably reactive grouping, a polymerization catalyst preferably is incorporated therein and the product converted to its ultimate form under heat as a result of conjoint polymerization and condensation reactions. Polymerizably reactive groupings may be introduced into the partial transesterification product by not transesterifying one of the unsaturated ester groupings of the starting cyanuric triester, or by using an unsaturated polyhydric alcohol reactant, e. g., 2-butene-1,4-diol, 2-butyne-1,4-diol, etc., or by both such means.

In some cases it may be desirable to incorporate a polymerization inhibitor into the reaction mass prior to reaction of the cyanuric triester with a polyhydric alcohol, more particularly when it is desired to obtain a linear polymer wherein one of the unsaturated ester groupings has been unreacted with the polyhydric alcohol and it is desired to obtain a product which is polymerizably reactive through unsaturated bonds in a side chain. Suitable polymerization inhibitors for this purpose are phenolic compounds, especially the polyhydric phenols, and aromatic amines. Specific examples of this group of inhibitors are hydroquinone, benzaldehyde, ascorbic acid, isoascorbic acid, resorcinol, tannin, sym. di-(beta-naphthyl)-p-phenylene diamine, phenolic resins, sulfur compounds, etc. The concentration of the inhibitor is preferably low, and less than about 1% by weight of the polymerizable composition is usually sufficient. However, with the preferred inhibitors, e. g., polyhydric phenols and aromatic amines, I prefer to use only about 0.01 to about 0.1% by weight of inhibitor, based on the weight of the polymerizable composition.

In some cases it also may be desirable to use a mixture of cyanuric triesters of the kind embraced by Formula I instead of a single triester.

In this way the reactivity of a sluggish cyanuric triester with a particular polyhydric alcohol is enhanced by the presence of a second, more reactive triester. The properties of the final product also may be varied by using a plurality of dihydric or other polyhydric alcohols with a single cyanuric triester or with a plurality of such triesters.

In order that those skilled in the art better may understand how the present invention may be carried into effect, the following examples are given by way of illustration and not by way of limitation. All parts are by weight unless otherwise stated.

*Example 1*

|  | Parts | Approx. Molar Ratio |
|---|---|---|
| Triallyl cyanurate | 500 | 2.0 |
| Triethylene glycol | 150 | 1.0 |
| Sodium | 5 |  |

In a reaction vessel fitted with a stirrer and a condenser arranged for downward distillation were placed 150 parts of triethylene glycol and 5 parts of metallic sodium. The mixture was warmed gently until the sodium had dissolved in the glycol. Five hundred parts of triallyl cyanurate was added, the stirrer started and the system evacuated to 50 mm. pressure by means of a water aspirator. The reaction vessel was then immersed in an oil bath and slowly heated over a period of 1 hour to 80° C. at the end of which period 116 parts of allyl alcohol was obtained. The resulting transesterification product was a tan-colored, rather cloudy, thick, viscous polymerizable oil. It was soluble in 50% acetic acid and benzene, but was insoluble in water, methanol and isopropanol. It was slightly soluble in butanol and dioxane.

*Example 2*

| | Parts |
|---|---|
| Transesterification product of Example 1 | 100 |
| Benzoyl peroxide | 1 | were heated together for 2 hours at 100° C., yielding a solid polymer which was yellow in color, hard and moderately brittle at room temperature.

*Example 3*

|  | Parts | Approx. Molar Ratio |
|---|---|---|
| Triallyl cyanurate | 100.0 | 1 |
| Ethylene glycol | 24.8 | 1 |
| Sodium | 0.4 |  |

The above-stated amount of ethylene glycol was placed in a reaction vessel fitted with a stirrer and a condenser arranged for downward distillation. The vessel was placed in an oil bath, after which the sodium was added to the glycol, and the resulting mixture was heated gently with stirring. As soon as all of the sodium had dissolved in the glycol, the triallyl cyanurate was added and the mixture was stirred and heated at 120° C. for 1½ hours. At the end of this period of time, the reaction was continued under a reduced pressure of 80 to 100 mm., with continuous stirring and while maintaining the bath temperature at 120° to 140° C., over a period of 4 to 5 hours. About twenty-eight parts by volume of allyl alcohol was collected as a distillate. The transesterification product was a clear, oily liquid of low viscosity. It was soluble in butanol and xylene, but insoluble in water and heptane.

*Example 4*

|  | Parts | Approx. Molar Ratio |
|---|---|---|
| Triallyl cyanurate | 100.0 | 2 |
| Ethylene glycol | 12.4 | 1 |
| Sodium | 0.2 |  |

Essentially the same procedure was followed as described under Example 3. The time of distillation under reduced pressure was about 5 hours. The amount of allyl alcohol evolved was about 13.2 parts by volume. The product was a light yellow oil of low viscosity. Its solubility characteristics were the same as the product of Example 3.

*Example 5*

|  | Parts | Approx. Molar Ratio |
|---|---|---|
| Triallyl cyanurate | 100.0 | 1 |
| Diethylene glycol | 42.4 | 1 |
| Sodium | 0.4 |  |

Essentially the same procedure was followed as described under Example 3. The time of distillation under reduced pressure was about 6 hours. About forty-eight parts by volume of allyl alcohol was collected as a distillate. The transesterfication product was a tan-colored, rubbery solid which was insoluble in water, xylene and heptane but partly soluble in butanol.

*Example 6*

|  | Parts | Approx. Molar Ratio |
|---|---|---|
| Triallyl cyanurate | 100.0 | 2 |
| Diethylene glycol | 21.2 | 1 |
| Sodium | 0.4 |  |

The procedure was essentially the same as described under Example 3 with the exception that the reaction was continued under a reduced pressure of 80 to 100 mm., with continuous stirring and while maintaining the bath temperature at 120° to 150° C., over a period of about 8 hours. About 10.4 parts by volume of allyl alcohol was obtained. The transesterfication product was a yellow, viscous oil which was soluble in butanol, insoluble in water and heptane, and partly soluble in xylene.

*Example 7*

Same as Example 6 with the exception that 0.8 part sodium was used as a catalyst. After heating and stirring for about 8 hours at 100° to 150° C., approximately 12 parts by volume of allyl alcohol was collected. An oily transesterification product was obtained. This product gelled after standing at room temperature for about 16 hours.

*Example 8*

|  | Parts | Approx. Molar Ratio |
|---|---|---|
| Triallyl cyanurate | 100.0 | 1 |
| Triethylene glycol | 60.0 | 1 |
| Sodium (dissolved in a small amount of methanol) | 0.5 |  |

Essentially the same procedure was followed as described under Example 3 with the exception that the reaction was continued under a reduced pressure of about 60 to 80 mm., with continuous stirring and while maintaining the bath temperature at 100° to 130° C., over a period of about 6 hours. About 44 parts by volume of allyl alcohol was evolved. The oily transesterification product initially obtained gelled after standing for about 16 hours at room temperature, yielding a brown, rubbery material which was insoluble in water, butanol, xylene and heptane.

*Example 9*

|  | Parts | Approx. Molar Ratio |
|---|---|---|
| Triallyl cyanurate | 100 | 2 |
| Triethylene glycol | 30 | 1 |
| Sodium (dissolved in a small amount of methanol) | 1 |  |

Essentially the same procedure was followed as described under Example 3 with the exception that the period of heating, following the initial heating period of 1½ hours at 120° C., was 2 hours under a reduced pressure of from 0.5 to 1 mm. while maintaining a bath temperature of 70° to 100° C. At the end of this period about 24.4 parts by volume of allyl alcohol had been evolved. The transesterification product was a very viscous, tan-colored oil which was insoluble in water and heptane but partly soluble in butanol and xylene.

*Example 10*

| | Parts |
|---|---|
| Transesterification product of Example 9 | 100 |
| Tertiary-butyl hydroperoxide | 2 | yielded a solid polymeric material when heated for about 10 minutes at 90° C.

*Example 11*

|  | Parts | Approx. Molar Ratio |
|---|---|---|
| Triallyl cyanurate | 100.0 | 1 |
| Triethylene glycol | 60.0 | 1 |
| Sodium (dissolved in a small amount of methanol) | 0.5 |  |

Essentially the same procedure was followed as described under Example 3 with the exception that the period of heating, following the initial heating period of 1½ hours at 120° C., was 1 hour under a reduced pressure of from 0.5 to 1 mm. while maintaining a bath temperature of 70° to 120° C. At the end of this period about 51 parts by volume of allyl alcohol had been evolved. The transesterification product was a yellow-colored, tough, rubbery material which was insoluble in water, butanol, xylene and heptane.

*Example 12*

|  | Parts | Approx. Molar Ratio |
|---|---|---|
| Triallyl cyanurate | 100 | 1 |
| Tetraethylene glycol | 78 | 1 |
| Sodium (dissolved in a small amount of methanol) | 1 |  |

The procedure followed in this example was essentially the same as that described under Example 3 with the exception that the reaction was continued under a reduced pressure of 0.5 to 1 mm., with continuous stirring and while maintaining the bath temperature at 80° to 90° C., over a period of about 1½ hours. About 48.5 parts by volume of allyl alcohol was obtained. The resulting transesterification product gelled upon standing at room temperature and formed a tough, rubbery, tacky material which was insoluble in water, xylene and heptane. The product did not dissolve in butanol but became swollen when immersed therein.

Example 13

|  | Parts | Approx. Molar Ratio |
|---|---|---|
| Triallyl cyanurate | 100 | 2 |
| Tetraethylene glycol | 39 | 1 |
| Sodium (dissolved in a small amount of methanol) | 1 | |

Essentially the same procedure was followed as described under Example 3 with the exception that the period of heating, following the initial heating period of 1½ hours at 120° C., was 45 minutes under a reduced pressure of from 0.5 to 1 mm. while maintaining a bath temperature of about 100° C. At the end of this reaction period about 25.2 parts by volume of allyl alcohol had been evolved. The transesterification product was a thick, viscous, tan-colored oil which was insoluble in water, xylene and heptane, and slightly soluble in butanol.

Example 14

|  | Parts | Approx. Molar Ratio |
|---|---|---|
| Triallyl cyanurate | 100.0 | 1 |
| Hexaethylene glycol | 112.8 | 1 |
| Sodium (dissolved in a small amount of methanol) | 1.0 | |

The procedure followed was essentially the same as that described under Example 3 with the exception that the reaction was continued under a reduced pressure of 0.5 to 1 mm. for 2 hours while maintaining a bath temperature of approximately 120° C. About 45.5 parts by volume of allyl alcohol was obtained. The resulting transesterification product was a tan-colored, viscous oil having the same general appearance and substantially the same solubility characteristics as the product of Example 13.

Example 15

|  | Parts | Approx. Molar Ratio |
|---|---|---|
| Triallyl cyanurate | 124.5 | 1 |
| Triethylene glycol | 75.0 | 1 |
| Sodium | 1.0 | |

In a suitable reaction vessel fitted with a stirrer, a thermometer and a water condenser set for downward distillation was placed 75 parts (0.5 mol) of triethylene glycol. The end of the condenser was attached to a vacuum adapter which emptied into a receiving vessel embedded in Dry Ice. The adapter was connected to a Dry-Ice trap, which in turn was connected to an oil pump. When all of the apparatus had been assembled, the stirrer was started and 1 part of sodium was dissolved in the triethylene glycol. The mixture was warmed to 60–70° C. to facilitate the solution of the sodium in the triethylene glycol. Next 124.5 parts (0.5 mol) of triallyl cyanurate was added to the glycol containing the dissolved sodium, the reaction vessel was closed and the system was evacuated to a pressure of 0.5 to 0.7 mm. The vessel was then immersed in an oil bath and heating and stirring were begun. At the intervals shown in the table which follows, samples of the reaction mass were tested for their solubility in water, butanol, heptane and xylene. The reaction was relatively slow. Evidence of transesterification was shown by the cloudy butyl alcohol solution or dispersion of the product after only 3.5 parts by volume of allyl alcohol had been distilled.

| Time, Min. | Bath Temp., °C. | Parts by Volume of Allyl Alcohol Distilled | Solubility of Reaction Mass in— | | | |
|---|---|---|---|---|---|---|
|  |  |  | H₂O | Butyl Alcohol | Xylene | Heptane |
| 0 | 25 | 0 | Part sol | Sol | Part sol | Part sol. |
| 10 | 40 | 2.0 | do | do | do | Do. |
| 20 | 50 | 3.0 | do | do | do | Do. |
| 30 | 77 | 3.5 | Insol | Sol., cloudy | do | Do. |
| 60 | 100 | 4.0 | do | do | do | Insol. |
| 80 | 110 | 4.5 | do | do | do | Do. |
| 100 | 120 | 5.0 | do | do | do | Do. |
| 120 | 127 | 6.0 | do | do | do | Do. |

Example 16

Same as Example 15 with the exception that 1.1 parts of sodium dissolved in about 24 parts of methanol was used as the catalyst. In this case the reaction proceeded more rapidly than in the prior example. The results are shown below. The formation of a transesterification product at a relatively low degree of reaction is indicated by the precipitation of the product from a butanol solution when only 9 parts by volume of allyl alcohol had been distilled.

| Time, Min. | Bath Temp., °C. | Parts by Volume of Allyl Alcohol Distilled | Solubility of Reaction Mass in— | | | |
|---|---|---|---|---|---|---|
|  |  |  | H₂O | BuOH | Xylene | Heptane |
| 0 | 25 | 0 | Part sol | Sol | Partially soluble | Part sol. |
| 5 | 50 | 9 | Sol.+ppt | Sol.+ppt | do | Insol. |
| 9 | 50 | 21 | Insol | do | do | Do. |
| 15 | 75 | 30 | do | do | Insol | Do. |
| 25 | 75 | 40 | do | do | do | Do. |
| 30 | 75 | 58 | do | do | do | Do. |

It will be understood, of course, by those skilled in the art that my invention is not limited to the specific polyhydric alcohols, cyanuric triester and catalysts named in the above illustrative examples. Thus instead of sodium or an alcoholate of sodium as a catalyst I may use any of the other alkali metals or alcoholates thereof. Other polyhydric alcohols in which the hydroxy groups are all primary or all secondary or some primary and some secondary may be employed, for example, glycerol, pentaerythritol, dipentaerythritol, sorbitol, mannitol, neopentyl glycol, dineopentyl glycol, trimethylol propane, trimethylol butane, 1,4-butanediol, 2-butene-1,4-diol, 2-butyne-1,4-diol, hexamethylene glycol, octamethylene glycol, decamethylene glycol, dodecamethylene glycol, 2-ethyl-1,3-hexanediol, pentaethylene glycol, heptaethylene glycol, octaethylene glycol, decaethylene glycol, 2-butyl-1,3-octanediol (2 - butyl - 3 - pentyl - 1,3 - propanediol), 2 - ethyl - 2 - methylol - 1 - hexanol (2 - ethyl - 2 - butyl - 1,3 - propanediol), 6 - methyl - 2,4 - heptanediol (1-methyl-3-isobutyl-1,3-propanediol), polyvinyl alcohols, polyallyl alcohols, polymethallyl alcohols, polyethylene glycol substances having an average molecular weight ranging between about 200 and 3000, e. g., such substances having an average molecular weight of (a) about 200 and comprising mainly tetraethylene glycol, (b) about 300 and comprising mainly hexaethylene glycol, (c) about 400 and comprising mainly nonaethylene glycol, (d) about 1500, (e) about 3000, etc., dipropylene glycol [(CH₃CHOHCH₂)₂O], dibutylene glycol [(CH₃CHOHCH₂CH₂)₂O], dipentylene glycol ([CH₃CHOH(CH₂)₃]₂O), dihexylene glycol ([CH₃CHOH(CH₂)₄]₂O), di-(2-hydroxyamyl) ether, etc.

Instead of triallyl cyanurate other cyanuric triesters of the kind embraced by Formula I may be employed, e. g., trimethallyl cyanurate, triethallyl cyanurate, tripropallyl cyanurate, tri-(2-butenyl) cyanurate, tri-(3-butenyl) cyanurate, tri-(3-methyl-2-butenyl) cyanurate, tri-(3-methyl-3-butenyl) cyanurate, tri-(2-pentenyl) cyanurate, tri-(3-pentenyl) cyanurate, tri-(4-pentenyl) cyanurate, tri-(2-methyl-2-pentenyl) cyanurate, tri-(3-methyl-4-pentenyl) cyanurate, tri-(2-hexenyl) cyanurate, tri-(2-octenyl) cyanurate, tri-(3-nonenyl) cyanurate, tri-(2-decenyl) cyanurate, 2-allyl-4,6-dimethallyl cyanurate, 2-(2'-butenyl)-4,6-diallyl cyanurate, 2-methallyl-4,6-diallyl cyanurate, 2-(3'-butenyl)-4,6-dimethallyl cyanurate, etc. Such compounds are prepared, for example, by methods such as described in the copending application of James R. Dudley, Serial No. 700,840, filed October 2, 1946, now Patent No. 2,537,816, issued January 9, 1951, with reference to a class of compounds that embraces the cyanuric triesters used in practicing the present invention.

The compositions of this invention may be modified in various ways, for example by effecting the reaction between the polyhydric alcohol and the cyanuric triester in the presence of various modifying agents. For instance the reaction may be effected in the presence of a monohydric alcohol having a boiling point higher than the alcohol by-product of the reaction, or in the presence of waxes or wax-like bodies, or various natural or synthetic resins or gums.

The polymerizable compositions of this invention may be polymerized alone or admixed with other monomeric materials copolymerizable therewith, for instance, a different reactive compound or compounds containing a $CH_2=C<$ grouping, more particularly a $CH_2=CH-CH_2-$ grouping, e. g., allyl acrylate, allyl methacrylate, diallyl carbonate, diallyl oxalate, diallyl maleate, diallyl fumarate, diallyl phthalate, diallyl succinate, triallyl aconitate, triallyl phosphate, triallyl cyanurate, tetraallyl silane, etc. Other examples of allyl compounds that may be employed are given, for example, in my copending application Serial No. 700,833, filed October 2, 1946, now Patent No. 2,510,503, issued June 6, 1950, and in the applications referred to therein.

Examples of other monomeric materials that may be copolymerized with the polymerizable compositions of this invention are the unsaturated alcohol esters, e. g., the allyl, methallyl, crotyl, 1-chloroallyl, 2-chloroallyl, cinnamyl, vinyl, methvinyl, 1-phenylallyl, butenyl, propargyl, butynyl, etc., esters of saturated and unsaturated, aliphatic and aromatic, monobasic and polybasic acids such, for instance, as acetic, propionic, butyric, valeric, caproic, acrylic, alkacrylic (e. g., methacrylic, ethacrylic, etc.), crotonic, oxalic, malonic, succinic, glutaric, adipic, pimelic, suberic, azelaic, sebacic, maleic, fumaric, citraconic, mesaconic, itaconic, acetylene dicarboxylic, aconitic, benzoic, toluic, phenylacetic, phthalic, terephthalic, benzoylphthalic, etc., acids; the saturated monohydric alcohol esters, e. g., the methyl, ethyl, propyl, butyl, isobutyl, etc., esters of unsaturated aliphatic monobasic and polybasic acids, illustrative examples of which appear above; vinyl cyclic compounds, e. g., styrene, chlorostyrenes, dichlorostyrenes, methyl styrenes, dimethyl styrenes, vinyl naphthalene, vinyl cyclohexane, vinyl furane, vinyl dibenzofuran, divinyl benzene, etc.; unsaturated ethers, e. g., ethyl vinyl ether, diallyl ether, methallyl ethyl ether, etc.; unsaturated amides, for instance, N-allyl caprolactam, acrylamide and N-substituted acrylamides, e. g., N-methylol acrylamide, N-methyl acrylamide, N-allyl acrylamide, etc.; unsaturated ketones, e. g., methyl vinyl ketone, divinyl ketone, methyl allyl ketone, etc.; methylene malonic esters, e. g., methylene methyl malonate, etc.; butadienes, e. g., 1,3-butadiene, 2-chlorobutadiene; unsaturated polyhydric alcohol (e. g., butenediol, butynediol, etc.) esters of saturated and unsaturated aliphatic and aromatic, monobasic and polybasic acids, illustrative examples of which appear above.

Instead of using a compound containing a $CH_2=C<$ grouping for copolymerization with the polymerizable compositions of this invention, I may employ other polymerizable materials, e. g., resins possessing a plurality of polymerizably reactive alpha,beta-enal groups, that is, the grouping

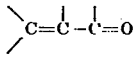

and which are herein designated as "unsaturated alkyd resins." Such resins are produced, for example, by the esterification of an unsaturated alpha,beta-polycarboxylic acid of the aliphatic series, more particularly an alpha,beta-unsaturated polycarboxylic acid, with a polyhydric alcohol, e. g., a glycol. The term "acid" and more specifically "polycarboxylic acid" as used herein includes within its meaning the anhydride thereof if available. The unsaturated alkyd resin is preferably one having an acid number not greater than 50, although in some cases resins having an acid number as high as 100 may be employed. The term "unsaturated alkyd resin" as used herein does not include within its meaning the conventional drying oil acid-modified alkyd resins in the preparation of which an aromatic or saturated aliphatic polycarboxylic acid or anhydride is employed.

Illustrative examples of unsaturated alkyd resins that may be used are those produced by reaction of the following ingredients: ethylene glycol and maleic anhydride; glycerine and maleic anhydride; diethylene glycol, maleic anhydride and phthalic anhydride; diethylene glycol and itaconic acid; ethylene glycol, maleic anhydride and succinic acid; ethylene glycol, itaconic acid and phthalic anhydride; diethylene glycol, maleic anhydride and tung oil acids; ethylene glycol, maleic anhydride, linseed oil acids and phthalic anhydride; diethylene glycol and maleic anhydride, linseed oil acids and phthalic anhydride; diethylene glycol and maleic anhydride; ethylene glycol, maleic anhydride and stearic acid; diethylene glycol, maleic anhydride and decyl alcohol; ethylene glycol, maleic anhydride, octyl alcohol and acetic anhydride; diethylene glycol, fumaric acid, tetrahydroabietyl alcohol and linseed oil fatty acids; alpha-propylene glycol and maleic anhydride; diethylene glycol, fumaric acid and benzyl alcohol; diethylene glycol, fumaric acid and tetrahydroabietyl alcohol; ethylene glycol, fumaric acid and omega-hydroxydecanoic acid; fumaric acid, diethylene glycol and linseed oil fatty acid monoglycerides; etc.

The proportions of the polymerizable composition of this invention and the monomeric material which is copolymerizable therewith may be varied as desired or as conditions may require, but ordinarily the proportions thereof in the polymerizable mixture will be within the range of, by weight, from about 10 to 90 per cent of the former to from about 90 to 10 per cent of the latter.

Any suitable means may be used in effecting polymerization of the polymerizable composition alone or admixed with a compound copolymerizable therewith. Heat or light or both, with or without a polymerization catalyst, may be employed. Ultraviolet light is more effective than ordinary light. The polymerization of the polymerizable composition is preferably accelerated by incorporating a polymerization catalyst therein. The polymerization catalysts include the organic superoxides, alcoholic and acidic peroxides. Among the preferred catalysts are: the acidic peroxides, e. g., benzoyl peroxide, phthalic peroxide, succinic peroxide and benzoyl acetic peroxide; fatty oil acid peroxides, e. g., coconut oil acid peroxides, lauric peroxide, stearic peroxide and oleic peroxide; alcohol peroxides, e. g., tertiary-butyl hydroperoxide; and terpene oxides, e. g., ascaridole. Still other polymerization catalysts may be used in some cases, e. g., soluble cobalt salts (particularly the linoleate and naphthenate), p-toluene sulfonic acid, aluminum chloride, stannic chloride, boron trifluoride, etc.

The concentration of the catalyst employed is usually small, i. e., for the preferred catalysts from, by weight, about 1 part catalyst per thousand parts of the material or mixture of materials to be polymerized to about 2 parts catalyst per hundred parts of the said material or mixture. If an inhibitor be present, up to 5% or even more by weight of catalyst, based on the weight of the polymerizable composition, may be necessary according to the concentration of the inhibitor. In most cases the temperature of polymerization or copolymerization will be within the range of 40° to 200° C., usually within the range of 60° to 130° C., depending upon the particular polymerizable composition employed, the particular catalyst, if any, used, the rapidity of polymerization or copolymerization wanted, and other influencing factors.

The resinous and other synthetic materials of this invention may be employed as modifiers, more particularly as plasticizers, of other synthetic resins, in order to impart toughness or improved plasticity and postformability to resins which otherwise are excessively brittle or have poor plasticity. They may be co-reacted with various aldehyde-reaction products, for instance, partial reaction products of an aldehyde, e. g., formaldehyde, and phenol or a substituted phenol, urea or a substituted urea, melamine or other aminotriazine, etc. They also may be incorporated into alkyd resins. For example, the reaction between the polyhydric alcohol and the cyanuric triester may be effected in the presence of an excess of the former, and the unreacted polyhydric alcohol then may be esterified with phthalic anhydride, maleic anhydride, fumaric acid or other polycarboxylic acid or anhydride in the presence of the transesterification product thereby to obtain a modified alkyd resin. Or, alternatively the cyanuric triester may be re-esterified using monoglycerides of mono or dibasic acids, e. g., linoleic diglyceride, phthalic diglyceride, etc.

The resinous or potentially resinous materials of this invention also may be employed in various textile-treating compositions for imparting texture and "hand" to the treated textile, as well as for casting, molding, coating, and electrically insulating purposes or as components of compositions used for such purposes. These new synthetic materials may be used alone or admixed with various fillers, pigments, dyes or other modifying agents, e. g., phenol-aldehyde resins, urea-aldehyde resins, melamine-aldehyde resins, alkyd resins, cellulose esters, cellulose ethers, hydrocarbon-substituted polysiloxane resins, etc. The soluble materials may be dissolved in naphtha, xylene, benzene, toluene, butanol, methyl ethyl ketone, amyl acetate, etc., to form coating and impregnating compositions of any desired viscosity. Such compositions may have incorporated therein linseed oil, tung oil, soya bean oil or acids thereof, or other drying or semi-drying oils or acids, as well as driers, more particularly metallic driers, e. g., cobalt naphthenate, manganese naphthenate, cobalt resinate, etc., to improve the adhesive and drying characteristics of the composition.

The polymerizable compositions of this invention are especially suitable for use as coating compositions or as components of such compositions, since the polyhydric alcohol residues attached to the triazine nucleus impart body, that is, high viscosity for a given solvent-to-resin ratio, to the composition, while the unsaturation permits curing of the resin film to take place by conjoint polymerization and condensation reactions. Those compositions containing a polymerizably reactive grouping or groupings possess the property of curing in the presence of air, that is, oxygen-convertibility. This phenomenon can be seen when such compositions, more particularly those which contain driers, e. g., cobalt naphthenate or lead naphthenate, are heated at an elevated temperature. Under certain conditions, e. g., when the thickness of the film is excessive, wrinkled films are obtained. Esters made with glycols possessing ether bridges apparently are more unstable to heat than those which are free of oxygen bridges. However, the former glycols appear to dry more rapidly when exposed to air and baked in the presence of driers.

I claim:

1. A polymerizable composition obtained by effecting a partial transesterification reaction between reactants consisting of (1) a cyanuric triester of a primary, ethylenically unsaturated aliphatic hydrocarbon, monohydric alcohol containing at least 3 and not more than 10 carbon atoms and (2) a polyhydric alcohol in which the hydroxy groups are members of the class consisting of primary and secondary hydroxy groups, the hydroxy groups being the only reactive substituent groups which are present in the said polyhydric alcohol, and the cyanuric triester of (1) being employed in an amount corresponding to substantially more than 1 mol thereof for each mol of the polyhydric alcohol of (2).

2. A product comprising the polymerized composition of claim 1.

3. A polymerizable composition which is a polymerizable product of a partial transesterification reaction between reactants consisting of triallyl cyanurate and triethylene glycol, the triallyl cyanurate being employed in an amount corresponding to substantially more than 1 mol thereof for each mol of triethylene glycol.

4. A product comprising the polymerized composition of claim 3.

5. The method of preparing a polymerizable composition which comprises effecting a partial transesterification reaction, in the presence of a catalyst for the reaction, between reactants consisting of (1) a cyanuric triester of a primary, ethylenically unsaturated aliphatic hydrocarbon, monohydric alcohol containing at least 3 and not more than 10 carbon atoms and (2) a polyhydric alcohol in which the hydroxy groups are members of the class consisting of primary and secondary hydroxy groups, the hydroxy groups being the only reactive substituent groups which are present in the said polyhydric alcohol, and the cyanuric triester of (1) being employed in an amount corresponding to substantially more than 1 mol thereof for each mol of the polyhydric alcohol of (2).

6. The method of preparing a polymerizable composition which comprises effecting a partial transesterification reaction, in the presence of a catalyst for the reaction, between reactants consisting of (1) a cyanuric triester of a primary, ethylenically unsaturated aliphatic hydrocarbon, monohydric alcohol containing at least 3 and not more than 10 carbon atoms and (2) a dihydric alcohol in which the hydroxy groups are primary and are the only reactive substituent groups present therein, the cyanuric triester of (1) being employed in an amount corresponding to substantially more than 1 mol thereof for each mol of the dihydric alcohol of (2).

7. The method of preparing a polymerizable composition which comprises forming a partial transesterification product by heating, at a temperature not exceeding about 155° C. and in the presence of an alkali metal as a catalyst for the reaction, a mixture of reactants consisting of (1) a cyanuric triester of a primary, ethylenically unsaturated aliphatic hydrocarbon, monohydric alcohol containing at least 3 and not more than 10 carbon atoms, (2) a dihydric alcohol in which the hydroxy groups are primary and are the only reactive substituent groups present therein, the cyanuric triester of (1) being employed in an amount corresponding to substantially more than 1 mol thereof for each mol of the dihydric alcohol of (2), and removing the volatile matter evolved during the reaction from the reaction vessel as transesterification between the reactants proceeds.

8. The method of preparing a polymerizable composition which comprises effecting a partial transesterification reaction by heating, under reduced pressure and at a temperature not exceeding about 155° C., a mixture of reactants consisting of (1) triallyl cyanurate, (2) a dihydric alcohol in which the hydroxy groups are primary and are the only reactive substituent groups present therein, the triallyl cyanurate being employed in an amount corresponding to not less than 2 mols thereof for each mol of the dihydric alcohol of (2), the said reaction being effected in the presence of a catalyst which is an alcoholate of an alkali metal, and the said catalyst being employed in an amount, calculated as alkali metal, corresponding to at least 1.5 mol per cent of the molar amount of the triallyl cyanurate employed, and removing the by-product alcohol from the reaction vessel as transesterification between the reactants proceeds.

9. The method of preparing a polymeric composition which comprises partially transesterifying, under reduced pressure and at a temperature not exceeding about 155° C., (1) triallyl cyanurate and (2) a dihydric alcohol in which the hydroxy groups are primary and are the only reactive substituent groups present therein, with the aid of a catalyst which is an alcoholate of an alkali metal, the triallyl cyanurate being employed in an amount corresponding to from 2 to 3 mols thereof for each mol of the dihydric alcohol reactant, and the said catalyst being employed in an amount, calculated as alkali metal, corresponding to from about 2 to about 10 mol per cent of the molar amount of the triallyl cyanurate used, distilling the by-product alcohol from the reaction vessel as transesterification between the reactants proceeds, and polymerizing the residual polymerizable partial transesterification product.

10. The method of preparing a polymerizable synthetic material which comprises effecting a partial transesterification reaction, by heating under reduced pressure, at a temperature not exceeding about 155° C. and in the presence of a catalyst for the reaction, a mixture of reactants consisting of (1) a cyanuric triester of a primary, ethylenically unsaturated aliphatic hydrocarbon, monohydric alcohol containing at least 3 and not more than 10 carbon atoms and (2) a polyhydric alcohol in which the hydroxy groups are members of the class consisting of primary and secondary hydroxy groups, the hydroxy groups being the only reactive substituent groups which are present in the said polyhydric alcohol, the cyanuric triester of (1) being employed in an amount corresponding to substantially more than 1 mol thereof for each mol of the polyhydric alcohol of (2), and removing the volatile matter evolved during the reaction from the reaction vessel as transesterification between the reactants proceeds.

11. A method as in claim 10 wherein the cyanuric triester of (1) is triallyl cyanurate.

12. A method as in claim 10 wherein the polyhydric alcohol of (2) is a dihydric alcohol in which the hydroxy groups are primary and are the only reactive substituent groups present therein.

13. A method as in claim 7 wherein the catalyst is an alcoholate of an alkali metal.

14. The method of producing a polymerizable composition which comprises warming a mixture of, by weight, 150 parts of triethylene glycol and 5 parts of metallic sodium until the sodium has dissolved in the said glycol; adding 500 parts by weight of triallyl cyanurate to the resulting mass and agitating the mixture; and heating the mixture to 80° C. under reduced pressure until 116 parts of allyl alcohol has been obtained.

15. The method of producing a solid polymer from a liquid polymerizable transesterification product of triallyl cyanurate and triethylene glycol in the approximate molar ratio of 2 mols of the former to 1 mol of the latter, said method comprising admixing a small amount of an organic peroxide polymerization catalyst with the said liquid transesterification product and heating the resulting admixture until a solid polymer has been obtained.

16. A method as in claim 15 wherein the organic peroxide polymerization catalyst is benzoyl peroxide.

17. A method as in claim 15 wherein the organic peroxide polymerization catalyst is tertiary-butyl hydroperoxide.

EDWARD L. KROPA.

REFERENCES CITED

The following references are of record in the file of this patent:

UNITED STATES PATENTS

| Number | Name | Date |
|---|---|---|
| 2,275,467 | Pollack et al. | Mar. 10, 1942 |
| 2,296,823 | Pollack et al. | Sept. 22, 1942 |
| 2,306,440 | Hentrich et al. | Dec. 29, 1942 |
| 2,381,121 | Ericks | Aug. 7, 1945 |
| 2,481,156 | Schaefer | Sept. 6, 1949 |
| 2,496,097 | Kropa | Jan. 31, 1950 |